Jan. 1, 1924

F. V. DONALD 1,479,288

POWER TRANSMISSION MECHANISM

Filed Oct. 24, 1921 2 Sheets-Sheet 1

Witness:
R. Burkhardt.

Inventor:
Forrest V. Donald,
By Wilkinson, Huxley, Byron & Knight
Attys.

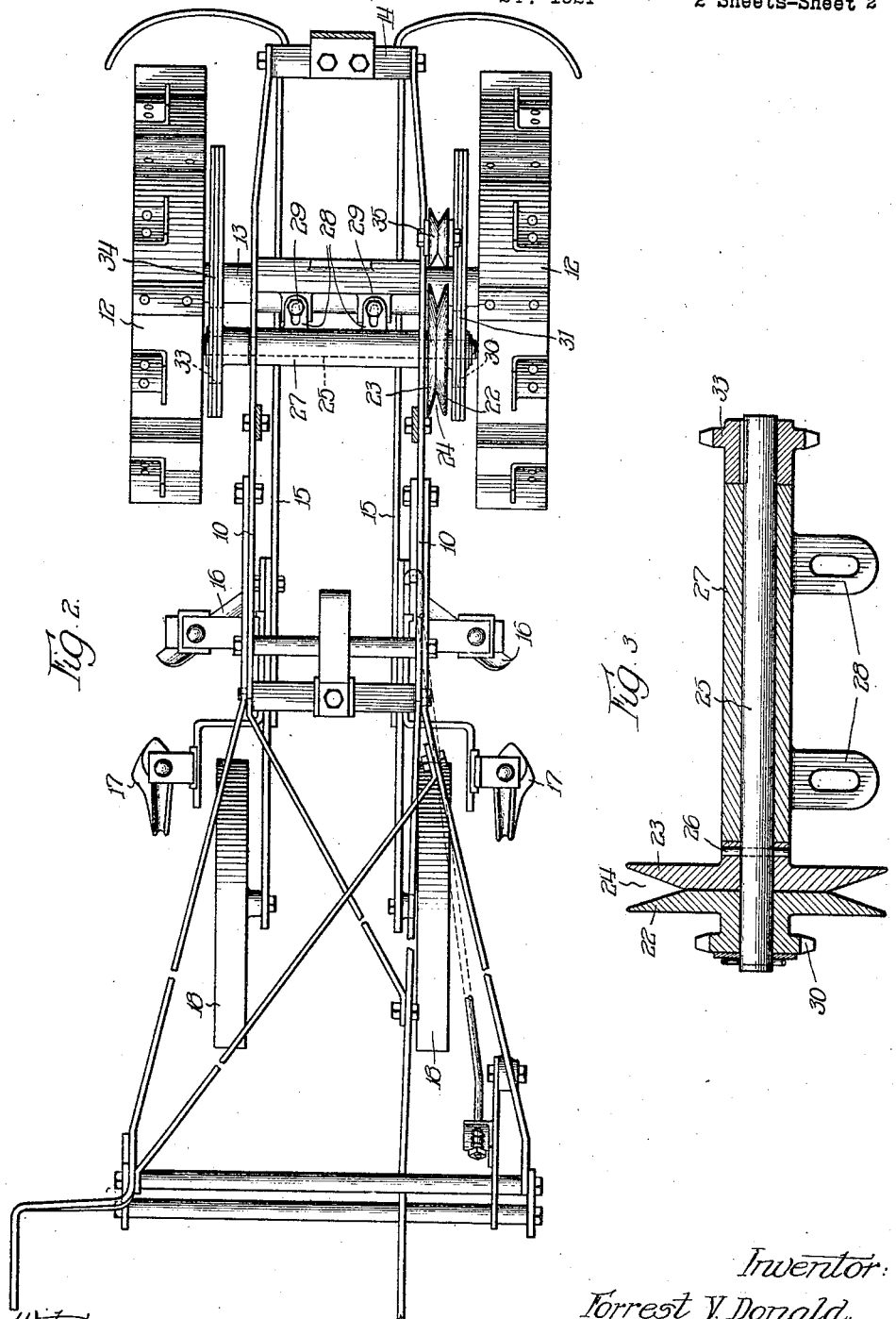

Patented Jan. 1, 1924.

1,479,288

UNITED STATES PATENT OFFICE.

FORREST V. DONALD, OF MINNEAPOLIS, MINNESOTA, ASSIGNOR TO GILSON MANUFACTURING CO., OF PORT WASHINGTON, WISCONSIN, A CORPORATION OF WISCONSIN.

POWER-TRANSMISSION MECHANISM.

Application filed October 24, 1921. Serial No. 509,873.

*To all whom it may concern:*

Be it known that I, FORREST V. DONALD, a citizen of the United States, residing at Minneapolis, in the county of Hennepin and State of Minnesota, have invented certain new and useful Improvements in Power-Transmission Mechanism, of which the following is a specification.

This invention relates to power transmission mechanism.

In this particular instance the invention is illustrated in connection with a garden power propelled ground working implement. It will be understood that the invention is not limited to such application for it may be used generally in connection with the transmission of power. However, in referring more specifically to power propelled implements, such as garden tractors, heretofore it has been the practice to drive the traction wheels of the tractor from the engine through transmission mechanism, including pinions mounted on opposite ends of a shaft, which pinions embodied ratchet mechanism permitting only the transmission of power for driving the traction wheels in a forward direction, that is to say, such ratchet mechanism would not permit the traction wheels to be moved in a direction permitting the backing of the tractor. It is particularly desirable that such traction wheels should be permitted to rotate in a rearward direction to facilitate the steering of the tractor, and more particularly to freely permit short turning of the latter.

Furthermore, in tractors including ratchet mechanism, as above described, it is possible for the tractor to run away in going down hill, because the traction wheels, under such circumstances, are not positively connected with the engine in a manner such that the engine is driven as a compressor by the traction wheels to act as a brake.

Accordingly, one object of my present invention is to improve power transmission mechanism which will permit certain relative movements between the parts thereof to facilitate the efficient operation of mechanism of which it forms a part in a combination.

Another object is to provide an improved power transmission mechanism for tractors which will permit easy steering and turning of the tractor.

Another object is to provide transmission mechanism for tractors between the traction wheels and the engine which will permit turning movements of the tractor and also maintain a controlled connection between the engine and traction wheels in a manner such that it is impossible for the tractor to run away when operating on a down grade.

These and other objects are accomplished by means of the arrangement disclosed on the accompanying sheets of drawings, in which—

Figure 2 is a fragmentary top plan view of the same; and

Figure 3 is a detail sectional view illustrating the main part of my improved power transmission mechanism.

Figure 1:
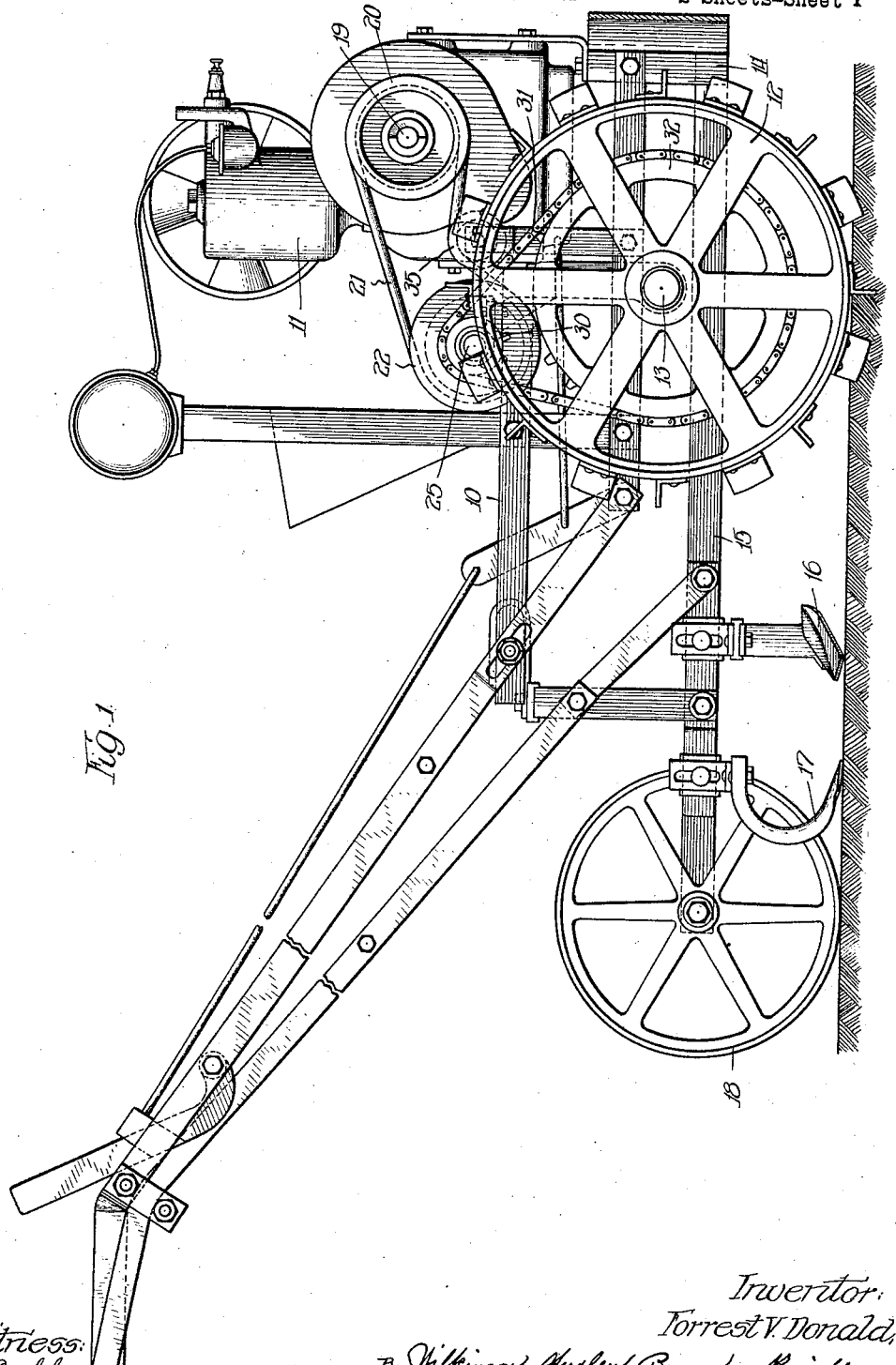
Figure 1 is a side elevation of a garden tractor embodying my invention.

The various novel features of my invention will be apparent from the following description and drawings, and will be particularly pointed out in the appended claims.

Referring to the figures of the drawings, it will be noted that I have disclosed my invention in connection with a tractor cultivator such as that shown in my co-pending application, Serial No. 499,432, filed September 9, 1921. This tractor cultivator includes a frame 10 carrying an engine 11, and carried by two traction wheels 12 which are mounted upon opposite ends of an axle 13. Connected to the forward portion 14 of the main frame structure is the tool carrying frame 15 which carries any suitable cultivating tools, such as scrapers 16 and shovels 17, the rear end of the tool carrying frame being supported by gauge wheels 18.

The engine 11 is operatively connected to the traction wheels 12 for propelling the tractor and includes a crank shaft 19, upon one end of which is mounted a sheave 20 around which passes a transmission belt 21. This belt also passes around a split sheave having two annular relatively movable parts 22 and 23, best shown in Figure 3. The outer portions of the inward adjacent faces of the sheave members 22 and 23 diverge radially outwardly to form a V-shaped groove 24 for the reception of the similarly shaped driving belt 21.

Heretofore it has been the practice in this general type of machine to have a solid one-piece sheave, instead of the multiple piece sheave here shown, mounted upon a shaft to the opposite ends of which pinions are rigidly connected, said pinions in turn being operatively connected to the traction wheels of the tractor for propelling the latter. With such an arrangement there is a ratchet and pawl mechanism associated with the pinions which will permit forward driving of the tractor but no rearward movement of the latter. As a result thereof steering is not accomplished as easily as might be, and turning the tractor short in a small space is almost impossible because one or the other of the wheels cannot move rearwardly to facilitate short turning and, as mentioned hereinabove, with such a ratchet and pawl arrangement there is no positive connection between the engine and the traction wheels when the traction wheels are rolling down hill at greater speed than they are driven by the engine.

I propose to facilitate steering and turning of the tractor in a small space by suitable power transmission mechanism and at the same time to maintain a positive connection between the traction wheels and engine so that when the tractor is going down hill it will be impossible for it to run away for the reason that the engine will then be driven as a compressor.

Referring again to Figure 3 of the drawings, it will be noted that the two parts 22 and 23 of the sheave are mounted upon a shaft 25, one part 22 being loosely or rotatably mounted upon said shaft and the other sheave part 23 being secured to the shaft by a key 26, the shaft being supported in a long bearing member 27 which may be secured to the engine frame or any other portion of the tractor by perforated brackets 28 and bolts 29. Integrally formed or otherwise secured to the sheave part 22 is a sprocket wheel 30 around which passes a chain 31 which also passes around a relatively large sprocket wheel 32 operatively connected to one of the traction wheels 12 for transmitting propelling power thereto. Keyed to the opposite end of the shaft 25 is another sprocket wheel 33 around which passes a chain 34 which in turn passes around another sprocket wheel 32 operatively associated with the other traction wheel 12 for transmitting propelling power thereto. Accordingly, it is seen that propelling power is transmitted from the engine 11 through a sheave having two independently and relatively movable parts 22 and 23, and that the driving belt 21 when in operative driving position engages both sheave parts 22 and 23. Under normal driving conditions, the driving belt 21 is maintained taut by a movably mounted idler sheave 35 which may be controlled in any suitable manner. When the driving belt 21 is in operative position, that is, in driving engagement with respect to both sheave parts 22 and 23 both traction wheels receive propelling power. If it is desired to steer the tractor or to turn same, and especially within a small space, the driving belt 21 is first slackened, whereupon the tractor may be turned about in a relatively small space, such as a two wheel cart would be, the same being permitted as a result of one of the wheels moving rearwardly and the other one moving forwardly. The relatively opposite turning movements of these traction wheels is permitted because of the permissible relative movement between the sheave parts 22 and 23. Furthermore, with the belt in operative or driving position, it is apparent that if the tractor is moving down hill at greater speed than the engine would be driving it, the traction wheels would then be driving the engine as a compressor, the engine under such conditions acting as a brake to prevent the tractor from running away.

It will be appreciated that this transmission mechanism may be used in combinations other than in a tractor transmission system.

It is my intention to cover all modifications of the invention falling within the spirit and scope of the following claims.

I claim:

1. In a tractor, the combination of a plurality of traction wheels, an engine for propelling same, and power transmission mechanism interposed therebetween including a sheave having two parts for jointly receiving a power transmission belt, one of said sheave parts being operatively connected to one of said traction wheels and the other sheave part being operatively connected to another traction wheel, said sheave parts being capable of relative rotative movement when the belt is slackened to permit a turning movement of the tractor.

2. In a tractor, the combination of traction wheels, means for driving said traction wheels, a power transmission mechanism therebetween including a shaft, a sheave comprising two separate parts mounted on said shaft, one of said sheave parts being loosely mounted on said shaft and operatively connected to one of said traction wheels and the other sheave part being keyed to said shaft and operatively connected to another of said traction wheels, power being transmitted through said sheave parts to said traction wheels when the belt is tight on said sheave, said sheave parts being capable of relative rotative movement for permitting a steering movement of the tractor when the belt is loose on said sheave.

3. In a tractor, the combination of a plurality of traction wheels, means for driving same, a transmission mechanism interposed between said driving means and traction wheels including a shaft, a sheave member loosely mounted on said shaft and operatively connected to one of said traction wheels, another sheave member secured to said shaft and operatively connected to another one of said traction wheels, said sheave members being arranged adjacent each other to receive a belt therebetween for transmitting power to said traction wheels when the belt is taut, said sheave members being free to have relative movement with respect to each other when the belt is slackened to facilitate turning of the tractor.

Signed at Port Washington, Wisconsin, this 18th day of October, 1921.

FORREST V. DONALD.